(12) United States Patent
Konings et al.

(10) Patent No.: US 8,083,185 B2
(45) Date of Patent: Dec. 27, 2011

(54) AIRCRAFT WING TIP HAVING A VARIABLE INCIDENCE ANGLE

(75) Inventors: Christopher A. Konings, Lynnwood, WA (US); Jeffrey P. Slotnick, Rancho Santa Margarita, WA (US)

(73) Assignee: The Boeing Company, Chicago, IL (US)

( * ) Notice: Subject to any disclaimer, the term of this patent is extended or adjusted under 35 U.S.C. 154(b) by 1184 days.

(21) Appl. No.: 11/936,751

(22) Filed: Nov. 7, 2007

(65) Prior Publication Data
US 2009/0200431 A1    Aug. 13, 2009

(51) Int. Cl.
*B64C 23/06*    (2006.01)
(52) U.S. Cl. .................... 244/199.4; 244/199.3; 244/201
(58) Field of Classification Search ............... 244/199.4, 244/199.3, 201, 199.2, 203
See application file for complete search history.

(56) References Cited

U.S. PATENT DOCUMENTS

| | | | |
|---|---|---|---|
| 2,745,613 A * | 5/1956 | Oswald et al. ............... 244/76 R |
| 2,846,165 A * | 8/1958 | Axelson ....................... 244/90 R |
| 4,671,473 A * | 6/1987 | Goodson ..................... 244/199.4 |
| 4,998,689 A * | 3/1991 | Woodcock ....................... 244/46 |
| 6,042,059 A * | 3/2000 | Bilanin et al. .............. 244/199.1 |
| 6,089,502 A | 7/2000 | Herrick et al. |
| 6,467,732 B2 * | 10/2002 | Tsukahara et al. .......... 244/199.4 |
| D488,765 S | 4/2004 | Boren |
| 7,275,722 B2 | 10/2007 | Irving et al. |
| 2005/0133672 A1 * | 6/2005 | Irving et al. ................... 244/201 |
| 2008/0191099 A1 * | 8/2008 | Werthmann et al. ........ 244/199.4 |

OTHER PUBLICATIONS

"Short Sherpa", http://en.wikipedia.org/wiki/Short_Sherpa.
"F-8 Crusader", http://en.wikipedia.org/wiki/F-8_Crusader.

* cited by examiner

*Primary Examiner* — Christopher P Ellis
(74) *Attorney, Agent, or Firm* — Tung & Associates

(57) ABSTRACT

An embodiment of an aircraft wing includes a main wing section and a variable incidence wing tip. The main wing section is adapted to connect to an aircraft fuselage at a first angle of incidence. The variable incidence wing tip is connected to the main wing section so that the variable incidence wing tip is rotatable to angles of incidence that are different from the first angle of incidence. An embodiment of a method for operating an aircraft includes generating a control signal based on an indication of a desired angle of incidence of a variable incidence wing tip, conveying the control signal to a wing tip rotation mechanism, and rotating the variable incidence wing tip in accordance with the control signal, so that the angle of incidence of the variable incidence wing tip is different from an angle of incidence of the main wing section.

20 Claims, 9 Drawing Sheets

US 8,083,185 B2

AIRCRAFT WING TIP HAVING A VARIABLE INCIDENCE ANGLE

TECHNICAL FIELD

Embodiments described herein generally relate to aircraft wing tips.

BACKGROUND

Advancements in aeronautical engineering have resulted in a continuous trend toward improved aircraft performance and safety over the years. In the area of aircraft performance, for example, engineers strive to design aircraft having reduced takeoff and landing speeds and distances, reduced stall speeds, increased load capacities, and increased cruising ranges. In the area of aircraft safety, for example, engineers strive to design aircraft that generate smaller wing tip wake vortices, and aircraft having robust systems for controlling flight control surfaces, among other things. Although many advancements and improvements have been made in aircraft designs, there is still room for additional improvement in many of the parameters that quantify aircraft performance and safety. Accordingly, what are needed are aircraft, aircraft components, and methods of operating aircraft, which result in improved aircraft performance and/or aircraft safety.

BRIEF SUMMARY

An embodiment of an aircraft has a fuselage and at least one wing connected to the fuselage. A wing of the at least one wing includes a main wing section and a variable incidence wing tip. The main wing section has a main wing inboard end and a main wing outboard end, where the main wing inboard end is adapted to connect to the fuselage at a first angle of incidence. The variable incidence wing tip has a wing tip inboard end and a wing tip outboard end, where the wing tip inboard end is connected to the main wing outboard end so that the variable incidence wing tip is rotatable to angles of incidence that are different from the first angle of incidence.

An embodiment of a wing for an aircraft includes a main wing section and a variable incidence wing tip. The main wing section has a main wing inboard end and a main wing outboard end, where the main wing inboard end is adapted to connect to the fuselage at a first angle of incidence. The variable incidence wing tip has a wing tip inboard end and a wing tip outboard end, where the wing tip inboard end is connected to the main wing outboard end so that the variable incidence wing tip is rotatable to angles of incidence that are different from the first angle of incidence.

An embodiment of a method for operating an aircraft includes the step of generating a first control signal, based on an indication of a desired angle of incidence of a first variable incidence wing tip that is rotatably connected to an outboard end of a first main wing section of the aircraft. The method also includes conveying the first control signal to a first wing tip rotation mechanism connected to the first main wing section and to the first variable incidence wing tip, and rotating the first variable incidence wing tip in accordance with the first control signal, so that the angle of incidence of the first variable incidence wing tip is different from an angle of incidence of the first main wing section.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Figure 3:
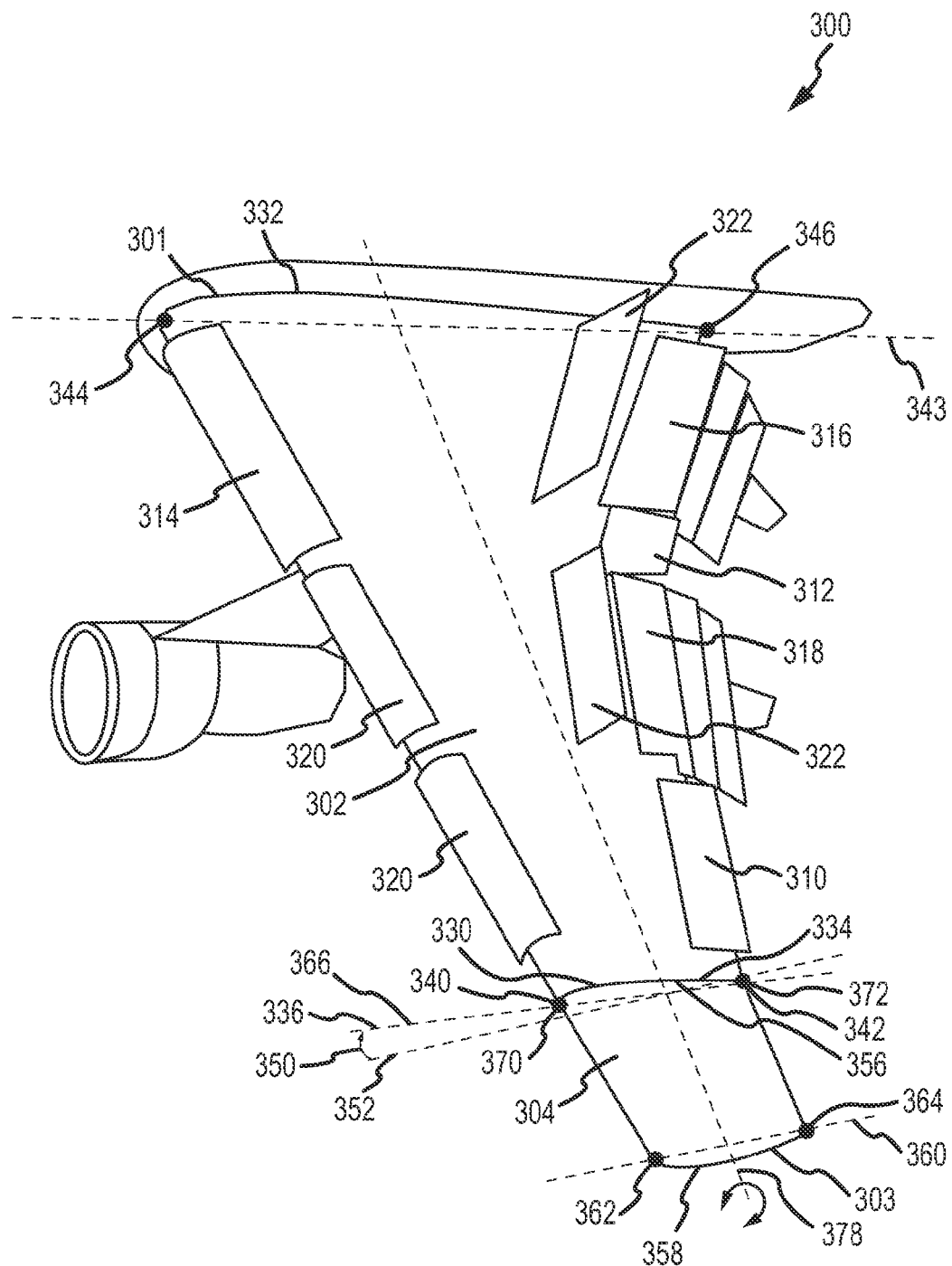
FIG. 3 illustrates an exterior view of an airplane wing, which includes a variable incidence wing tip in a non-rotated position, in accordance with an example embodiment.

Embodiments include aircraft and aircraft wings, which include a variable incidence wing tip (e.g., variable incidence wing tip 304, FIG. 3) that is rotatably attached to a main wing section (e.g., main wing section 302, FIG. 3). By controlling the angle of rotation of the variable incidence wing tip with respect to the main wing section, the wing tip angle of incidence can be increased or decreased, with respect to the main wing angle of incidence. Altering (e.g., increasing or decreasing) the wing tip angle of incidence with respect to the main wing angle of incidence, in accordance with various embodiments, may produce one or more effects, with respect to the performance of the aircraft. For example, altering the wing tip angle of incidence may have the effect of achieving better airflow attachment to the wing tip, which may, in turn, increase the stall performance of the aircraft (e.g., reduced stall speed and/or landing approach speed), which may result in reduced landing field lengths. As another example, altering the wing tip angle of incidence may result in increased lift at various operational angles of attack, thus potentially improving takeoff and/or landing performance. As yet another example, the wing tip angle of incidence may be altered to achieve wing-span loading modifications in a cruising configuration, which may result in an increased range. Altering the wing tip angle of incidence also may be used as a way to create separated air flow on the wing tip, which may be used, for example, as an in-flight spoiler to help capture glide path or reduce speed, and/or to assist in reducing wake vortices. In addition, during ground operations, altering the wing tip angle of incidence may provide for enhanced braking, which may also result in reduced landing field lengths. Enhanced ground braking achieved by varying the wing tip angle of incidence may also result in reduced braking distances, for example, during rejected takeoff situations.

In addition or alternatively, variable incidence wing tips may be controlled in order to augment or replace the functionality of other flight control surfaces, in various embodiments. This augmentation or replacement may be performed during normal flight operations, or in the event that one or more flight control surfaces becomes inoperable during flight. For example, when variable incidence wing tips are rotated in a same direction, they may produce attitude adjustments that are similar to those produced by elevators (e.g., elevators 120, FIG. 1). In other words, they may cause the nose of the aircraft to rotate up or down about a lateral axis (e.g., lateral axis 122, FIG. 1) of the aircraft. As another example, when variable incidence wing tips are rotated in opposing directions (e.g., one is rotated upward and one is rotated downward), they may produce attitude adjustments that are similar to those produced by ailerons (e.g., ailerons 140, FIG. 1). In other words, they may cause the wings to rotate up or down about the longitudinal axis (e.g., longitudinal axis 110, FIG. 1) of the aircraft.

As used herein, the term "aircraft" means any one of a number of vehicles that include one or more fixed wings attached to a fuselage or aircraft body. The term "aircraft" is intended to include, but is not limited to, airplanes, gliders, missiles, rockets, satellites, spacecraft, and spaceplanes. Embodiments will be described herein with respect to fixed-wing airplanes, and it is to be understood that some or all of the described embodiments may also be applied to other types of aircraft, in alternate embodiments. Accordingly, the scope of at least some of the appended claims is intended to encompass those alternate embodiments.

Figure 1:
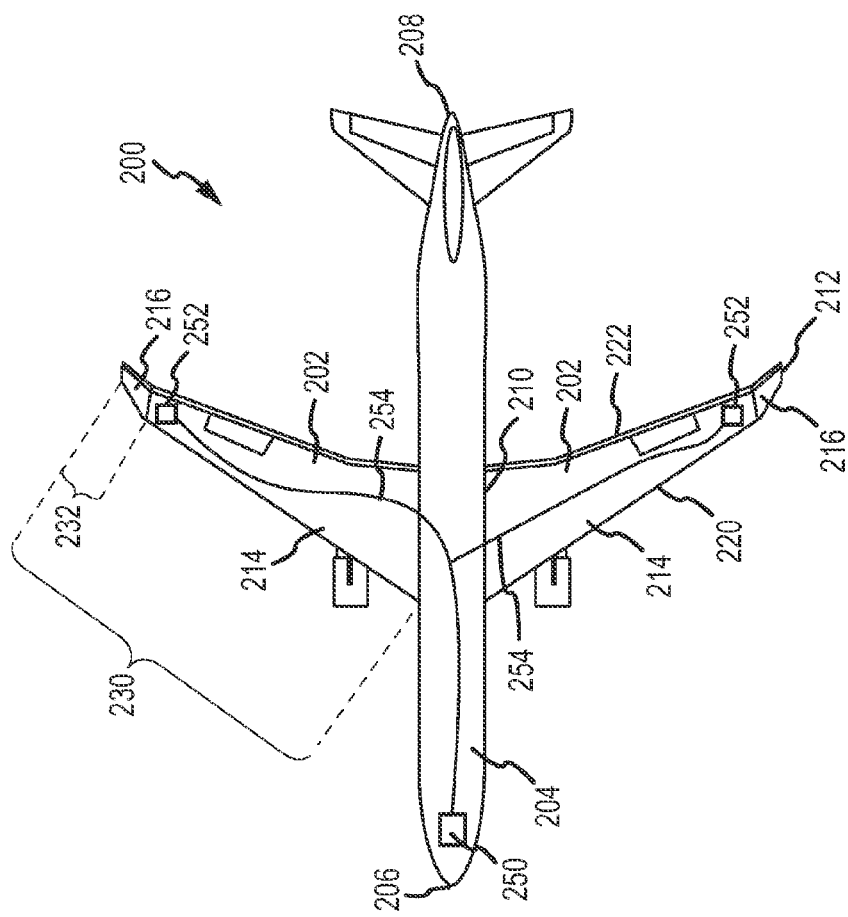
FIG. 1 illustrates a top view of an airplane that includes variable incidence wing tips, in accordance with an example embodiment.

FIG. 1 illustrates a top view of an airplane 100 that includes variable incidence wing tips 136, in accordance with an example embodiment. Airplane 100 includes a fuselage 104, having ends that are commonly referred to as a nose 106 and a tail 108. A longitudinal axis 110 (also referred to as a "roll axis") is defined along a length of fuselage 104 between the nose 106 and the tail 108. Fuselage 104 may be adapted to hold crew, passengers, and/or cargo. Fuselage 104 may include a semi-monocoque, monocoque shell, box truss, geodesic or other types of structure, in various embodiments.

In addition, airplane 100 includes two opposed wings 112, horizontal stabilizers 114, vertical stabilizer 116, and engines 118. One or more elevators 120 are rotatably connected to each of horizontal stabilizers 114. Elevators 120 are considered to be flight control surfaces, which are controllable to cause the nose 106 of the airplane 100 to rotate up or down about a lateral axis 122 (also referred to as a "pitch axis"). A rudder (not shown) is rotatably connected to vertical stabilizer 116. The rudder also is considered to be a flight control surface, which is controllable to cause the nose 106 of the airplane 100 to rotate left or right about a vertical axis 124 (also referred to as a "yaw axis"), which is represented by an "X" in FIG. 1, as it is oriented in a direction coming out of the page. Engines 118 may be fixedly attached to wings 112, as illustrated in FIG. 1. In various alternate embodiments, one or more engines may alternatively be attached to vertical stabilizer 116, fuselage 104 or other portions of airplane 100. Engines 118 may be jet engines, as illustrated in FIG. 1, or they may alternatively be rocket engines or propeller engines. In still another alternate embodiment in which airplane 100 is a glider, engines 118 may be excluded altogether.

Wings 112 are attached to opposing sides of fuselage 104 between the nose 106 and the tail 108. Each wing 112 has a proximal end 130 and a distal end 132. In an embodiment, each wing 112 includes a main wing section 134 and a variable incidence wing tip 136. As used herein, the term "variable incidence wing tip" (e.g., variable incidence wing tip 136) means a portion of a wing (e.g., wings 112) that is positioned proximate to a distal end of the wing (e.g., distal end 132), and which may be rotated about a rotation axis (e.g., rotation axis 378, FIG. 3) in order to vary the angle of incidence of the portion of the wing. In an embodiment, a variable incidence wing tip may be considered to be a flight control surface, as will be described in more detail later.

Each main wing section 134 includes an inboard end 138 and an outboard end 139. The inboard end 138 of each main wing section 134 is fixedly attached to fuselage 104, in an embodiment. In an alternate embodiment, the inboard end 138 of each main wing section 134 may be rotatably attached to fuselage 104, where the rotation axis is substantially parallel to vertical axis 124 (e.g., for airplanes that can vary the sweep angle of their wings). The outboard end 139 of each main wing section 134 is rotatably attached to a variable incidence wing tip 136, as will be described in more detail later. One or more ailerons 140 are rotatably connected to each wing 112. In an embodiment, ailerons 140 are rotatably connected to the main wing section 134 of each wing. In alternate embodiments, ailerons may also or alternatively be connected to the variable incidence wing tip 136 of each wing. Ailerons 140 also are considered to be flight control surfaces, which are controllable to cause wings 112 to rotate up or down about the longitudinal axis 110. Besides ailerons 140, various additional flight control surfaces (e.g., flaps and/or slats) may be rotatably or movably connected to wings 112, as will be explained in more detail in conjunction with FIG. 2.

Each wing 112 includes a leading edge 142 and a trailing edge 144. Leading edge 142 includes a main wing section of the leading edge 142, and a variable incidence wing tip portion of the leading edge 142. An overall length 146 of each wing 112 may be defined as the length of the leading edge 142 from the proximal end 130 to the distal end 132. In an embodiment, a length 148 of each variable incidence wing tip 136 is in a range of about 5% to about 15% of the overall length 146 of each wing 112, where the length 148 of each variable incidence wing tip 136 may be measured as the variable incidence wing tip portion of the leading edge 142. In another embodiment, the length 148 is in a range of about 5% to about 20% of the overall length 146. In yet another embodiment, the length 148 is in a range of about 5% to about 30% of the overall length 146. In still other embodiments, the length 148 may be greater than or smaller than the boundaries of the above-listed ranges.

As will be described in more detail later, the angle of incidence of each variable incidence wing tip 136 may be varied about a rotation axis (e.g., rotation axis 378, FIG. 3) that is substantially coplanar with the chord plane of the main wing section 134, and which is oriented in a direction generally between the proximal end 130 and distal end 132 of a wing 112. Rotation of each variable incidence wing tip 136 is achieved, in an embodiment, using a wing tip rotation control system that includes a cockpit controller 150, a wing tip rotation mechanism 152, and a control signal transmission means 154 therebetween. Control signal transmission means 154 may include mechanical, pneumatic, electrical, and/or wireless transmission means, in various embodiments. Cockpit controller 150 may include various mechanical or electrical user interface input devices adapted to enable a pilot or other flight personnel to adjust the angle of incidence of each variable incidence wing tip 136. In addition, cockpit controller 150 may include various user interface output devices adapted to display or indicate control settings, and or to provide feedback indicators of the actual angles of incidence of each variable incidence wing tip 136. As will be discussed in more detail later, the angles of incidence of the variable incidence wing tips 136 may be adjustable in a coordinated manner (e.g., the angle of incidence of one wing tip 136 is substantially equal to the angle of incidence of the other wing tip 136 in the same or opposite directions), or in an uncoordinated manner (e.g., the angles of incidence of the wing tips 136 are separately and independently adjustable).

In the illustrated embodiment, each wing 112 has a swept wing configuration, in which the distal end 132 of the wing 112 is "swept back" or further abaft the proximal end 130. As used herein, the term "degree of sweep" refers to the angle between the lateral axis 122 and the main wing section of the leading edge 142 or the variable incidence wing tip portion of the leading edge 142. In alternate embodiments, the wings may be set at substantially right angles to the lateral axis 122, or may be swept forward. Accordingly, in various embodiments, the degree of sweep may be a positive angle (e.g., for a swept back configuration), a negative angle (e.g., for a swept forward configuration) or about 0 degrees (e.g., for a configuration in which the wings are set at substantially right angles to the lateral axis 122).

In the embodiment illustrated in FIG. 1, the leading edges of variable incidence wing tips 136 are substantially linear extensions of the leading edges of main wing sections 134, meaning that the degree of sweep of the variable incidence wing tips 136 is substantially the same as the degree of sweep of the main wing sections 134. In other embodiments, the degrees of sweep of the variable incidence wing tips and the main wing sections may be substantially different. In a particular embodiment, all or portions of each variable incidence wing tip may be "raked," meaning that the degree of sweep of the variable incidence wing tip is larger than the degree of sweep of the main wing section. The term "raked, variable incidence wing tip" means a variable incidence wing tip for which substantially all or a portion of the wing tip has a larger degree of sweep than the main wing section. Use of a raked, variable incidence wing tip may result in an increased effective aspect ratio of the wing, which may result in one or more advantages. For example, a raked, variable incidence wing tip may result in improved fuel economy, improved climb performance, decreased incidence and/or severity of wingtip vortices, decreased lift-induced drag, and/or shorter takeoff distances.

Figure 2:
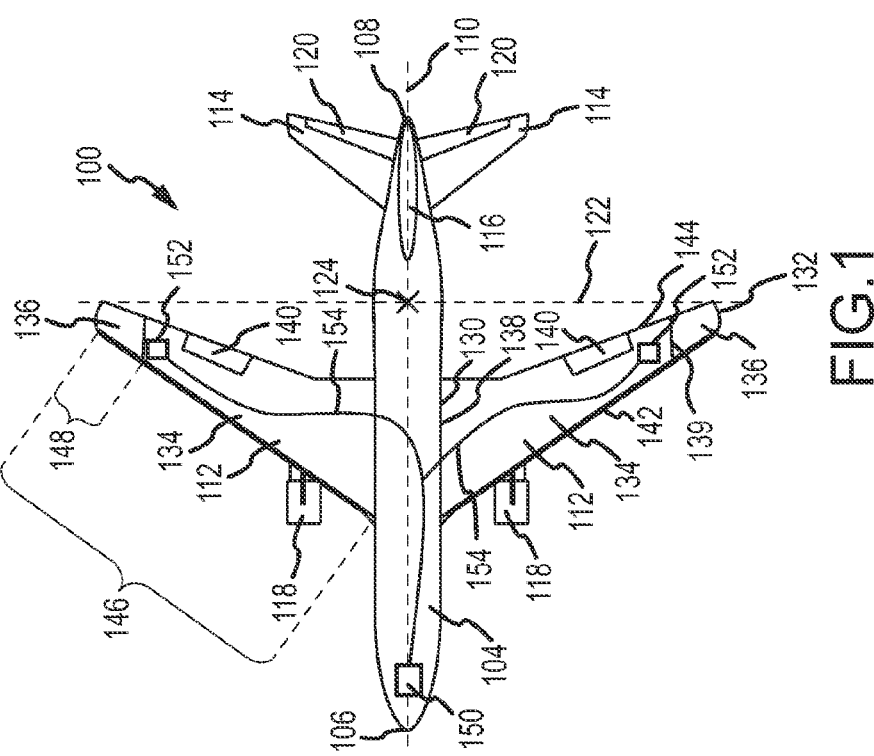
FIG. 2 illustrates a top view of an airplane that includes raked, variable incidence wing tips, in accordance with an example embodiment.

FIG. 2 illustrates a top view of an airplane 200 that includes raked, variable incidence wing tips 216, in accordance with an example embodiment. Along with other features discussed in conjunction with FIG. 1, airplane 200 includes wings 202, which are attached to opposing sides of fuselage 204 between the nose 206 and the tail 208 of the fuselage 204. Each wing 202 has a proximal end 210 and a distal end 212. In an embodiment, each wing 202 includes a main wing section 214 and a raked, variable incidence wing tip 216.

Each wing 202 includes a leading edge 220 and a trailing edge 222. Leading edge 220 includes a main wing section of the leading edge 220, and a raked, variable incidence wing tip portion of the leading edge 220. An overall length 230 of each wing 202 may be defined as the length of the leading edge 220 from the proximal end 210 to the distal end 212. In an embodiment, a length 232 of each raked, variable incidence wing tip 216 is in a range of about 5% to about 15% of the overall length 230 of each wing 202, where the length 232 of each raked, variable incidence wing tip 216 may be measured as the raked, variable incidence wing tip portion of the leading edge 220. In another embodiment, the length 232 is in a range of about 5% to about 20% of the overall length 230. In yet another embodiment, the length 232 is in a range of about 5% to about 30% of the overall length 230. In still other embodiments, the length 232 may be greater than or smaller than the boundaries of the above-listed ranges.

As will also be described in more detail later, the angle of incidence of each raked, variable incidence wing tip 216 may be varied about a rotation axis (e.g., rotation axis 606, FIG. 6) that is substantially coplanar with the chord plane of the main wing section 214, and which is oriented in a direction generally between the proximal end 210 and distal end 212 of a wing 202. Rotation of each raked, variable incidence wing tip 216 is achieved, in an embodiment, using a wing tip rotation control system that includes a cockpit controller 250, a rotation mechanism 252, and a control signal transmission means 254 therebetween. Embodiments of the control system may be identical to or similar to embodiments of control systems discussed in conjunction with FIG. 1, and a description of those embodiments will not be repeated here for purposes of brevity.

Additional details regarding the physical structure and operation of variable incidence wing tips will now be presented in conjunction with FIGS. 3-12. In particular, FIG. 3 illustrates an exterior view of an airplane wing 300, which includes a variable incidence wing tip 304 in a non-rotated position, in accordance with an example embodiment. Wing 300 includes a proximal end 301 and a distal end 303. As discussed previously, wing 300 includes a main wing section 302 and a variable incidence wing tip 304, in an embodiment. Wing 300 may also include one or more flight control surfaces, including low speed ailerons 310, high speed ailerons 312, leading edge flaps 314, trailing edge flaps 316, 318, slats 320, and/or spoilers 322, for example. In an embodiment, some or all of these flight control surfaces may be rotatably or movably connected to main wing section 302. In alternate embodiments, one or more flight control surfaces (e.g., low speed ailerons and/or slats) may be rotatably or movably connected to variable incidence wing tips 304.

Variable incidence wing tip 304 is connected to main wing section 302 at juncture 330. As will be described in more detail in conjunction with FIG. 11, the connection is achieved, in an embodiment, using a rotation mechanism (e.g., wing tip rotation mechanism 152, 1102, FIGS. 1, 11) that connects to both the main wing section 302 and the variable incidence wing tip 304, and that spans juncture 330. The term "juncture," as used herein, means an area spanning the space between variable incidence wing tip 304 and main wing section 302. A juncture perimeter of main wing section 304 and variable incidence wing tip 304 refers to the perimeter shapes of each of these elements at the juncture (e.g., the vertical cross-sectional shapes of each element taken between the leading and trailing edges). In an embodiment, each of main wing section 302 and variable incidence wing tip 304 include substantially parallel juncture perimeters (hidden in FIG. 3), which oppose each other across juncture 330, and which are defined by the outer perimeter of each of the main wing section 302 and the variable incidence wing tip 304 at the juncture 330. The substantially parallel juncture perimeters of the main wing section 302 and the variable incidence wing tip 304 have substantially the same shape, in an embodiment. In other embodiments, the juncture perimeters of the main wing section 302 and the variable incidence wing tip 304 may be non-parallel and/or may have different shapes from each other.

Main wing section 302 includes a main wing inboard end 332 and a main wing outboard end 334. Inboard end 332 is coincident with the proximal end 301 of wing 300, and is adapted to connect to a fuselage (e.g., fuselage 104, FIG. 1) of an aircraft. Outboard end 334 is coincident with juncture 330. An outboard, main wing chord 336 is defined as a line, at the outboard end 334 of main wing section 302, which extends between a leading edge point 340 and a trailing edge point 342 of main wing section 302. An inboard, main wing chord 343 is defined as a line, at the inboard end 332 of main wing section 302, which extends between another leading edge point 344 and another trailing edge point 346 of main wing section 302. A "main wing chord plane" is defined as a plane between the proximal end 301 and the distal end 334 of the main wing section 302, which includes the outboard, main wing chord 336 and the inboard, main wing chord 343. In an embodiment, main wing section 302 is attached to the fuselage (e.g., fuselage 104, FIG. 1) at substantially fixed, main wing angle of incidence 350, which may be defined as the angle between the longitudinal axis (e.g., longitudinal axis 110, FIG. 1) of the airplane (an offset, co-planar representation of which is depicted by line 352, and which is referred to herein as an "offset longitudinal axis") and the outboard, main wing chord 336. In an embodiment, the main wing angle of incidence 350 is in a range of about 3 degrees to about 9 degrees, although the main wing angle of incidence 350 may be larger or smaller than the above given range, in other embodiments. The term "angle of incidence" is not to be confused with the term "angle of attack," which refers to the angle that a wing chord (e.g., outboard, main wing chord 336, FIG. 3) presents to the direction of airflow during flight.

Variable incidence wing tip 304 includes a wing tip inboard end 356 and a wing tip outboard end 358. Inboard end 356 is coincident with juncture 330, and outboard end 358 is coincident with the distal end 303 of wing 300. The inboard end 356 of variable incidence wing tip 304 is rotatably connected to the outboard end 334 of main wing section 302 at juncture 330. An outboard, wing tip chord 360 is defined as a line, at the outboard end 358 of variable incidence wing tip 304, which extends between a leading edge point 362 and a trailing edge point 364 of variable incidence wing tip 304. An inboard, wing tip chord 366 is defined as a line, at the inboard end 356 of variable incidence wing tip 304, which extends between another leading edge point 370 and another trailing edge point 372 of variable incidence wing tip 304. In FIG. 3, the inboard, wing tip chord 366 appears to be coincident with the outboard, main wing chord 336, although chords 366 and 336 may be offset from each other across the distance of juncture 330. A "wing tip chord plane" is defined as a plane that includes the outboard, wing tip chord 360 and the inboard, wing tip chord 366.

In FIG. 3, variable incidence wing tip 304 is shown in a "non-rotated position," meaning that the inboard, wing tip chord 366 lies substantially within the main wing chord plane, and/or that the main wing chord plane and the wing tip chord plane are substantially co-planar. As will be depicted and described in more detail in conjunction with FIGS. 4-5, variable incidence wing tip 304 is rotatably connected to main wing section 302 at juncture 330, meaning that variable incidence wing tip 304 is adapted to be rotated, with respect to main wing section 302 so that the inboard, wing tip chord 366 does not lie within the main wing chord plane, even though they intersect, and/or that the main wing chord plane and the wing tip chord plane are not co-planar, even though they intersect. When rotated, with respect to the main wing section 302, variable incidence wing tip 304 will have a different (e.g., greater or smaller) angle of incidence from the angle of incidence of the main wing section 302.

In an embodiment, the inboard end 356 of the variable incidence wing tip 304 is rotatably connected to the outboard end 334 of main wing section 302, such that variable incidence wing tip 304 so that an angle of rotation between the wing tip chord plane and the main wing chord plane is variable about a rotation axis 378. In an embodiment, rotation axis 378 extends at least partially through each of the fuselage (e.g., fuselage 104, FIG. 1), the main wing section 302, and the variable incidence wing tip 304. In an embodiment, the rotation axis 378 is substantially perpendicular to the juncture interface. In other embodiments, the rotation axis 378 is substantially parallel with the leading edges of the main wing section 302, the variable incidence wing tip 304, or both. In still other embodiments, the rotation axis 378 is substantially parallel with the trailing edges of the main wing section 302, the variable incidence wing tip 304, or both. In still another embodiment, the rotation axis 378 is substantially perpendicular to the lateral axis (e.g., lateral axis 110, FIG. 1) of the airplane.

Figure 4:
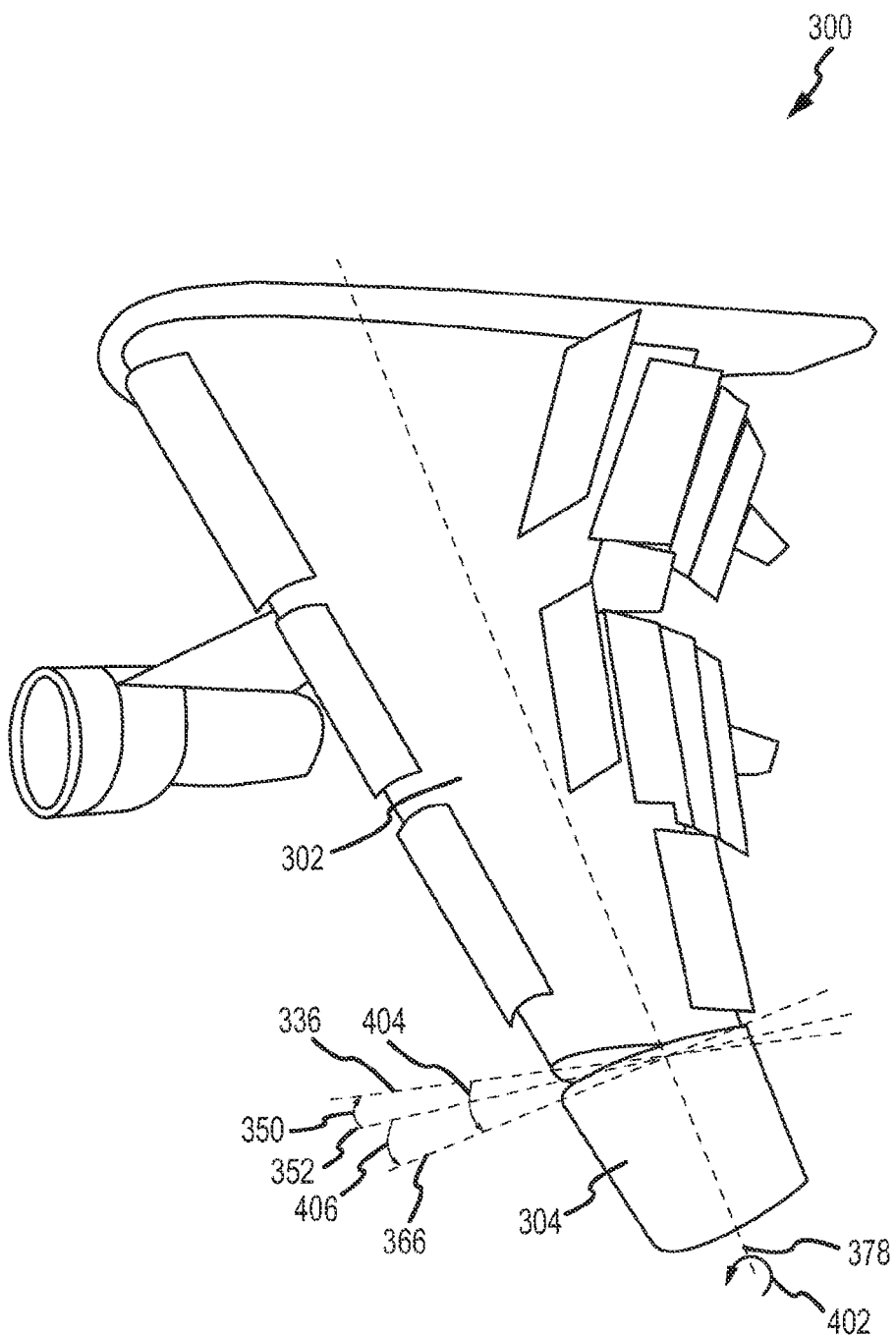
FIG. 4 illustrates an exterior view of the airplane wing of FIG. 3, in which the variable incidence wing tip has been rotated to a first rotated position, in accordance with an example embodiment.

FIG. 4 illustrates an exterior view of the airplane wing 300 of FIG. 3, in which the variable incidence wing tip 304 has been rotated to a first rotated position, in accordance with an example embodiment. In the illustrated embodiment, variable incidence wing tip 304 has been rotated from the non-rotated position (FIG. 3), about rotation axis 378, in a first (counter-clockwise) direction 402 by an angle of rotation 404. Assuming that main wing angle of incidence 350 is considered to be a positive angle, rotation in the first direction 402 has the result of reducing the angle of incidence of variable incidence wing tip 304 by the angle of rotation 404. The angle of rotation 404 may be quantified as an angular difference between outboard, main wing chord 336 and inboard, wing tip chord 366. The angle of incidence 406 of variable incidence wing tip 304 may be quantified as the angular difference between the offset longitudinal axis 352 and the inboard, wing tip chord 366. In various embodiments, the angle of incidence 406 of variable incidence wing tip 304 may be reduced to a smaller positive value (when the main wing angle of incidence 350 has a positive value), to zero, and/or to a negative value. In an embodiment, variable incidence wing tip 304 may be rotated in the first direction 402 by an angular value within a range of 0 degrees to 90 degrees, and accordingly, variable incidence wing tip 304 may be rotated to have a difference in angle of incidence from the main wing section 302 in a range of 0 degrees to −90 degrees.

Figure 5:
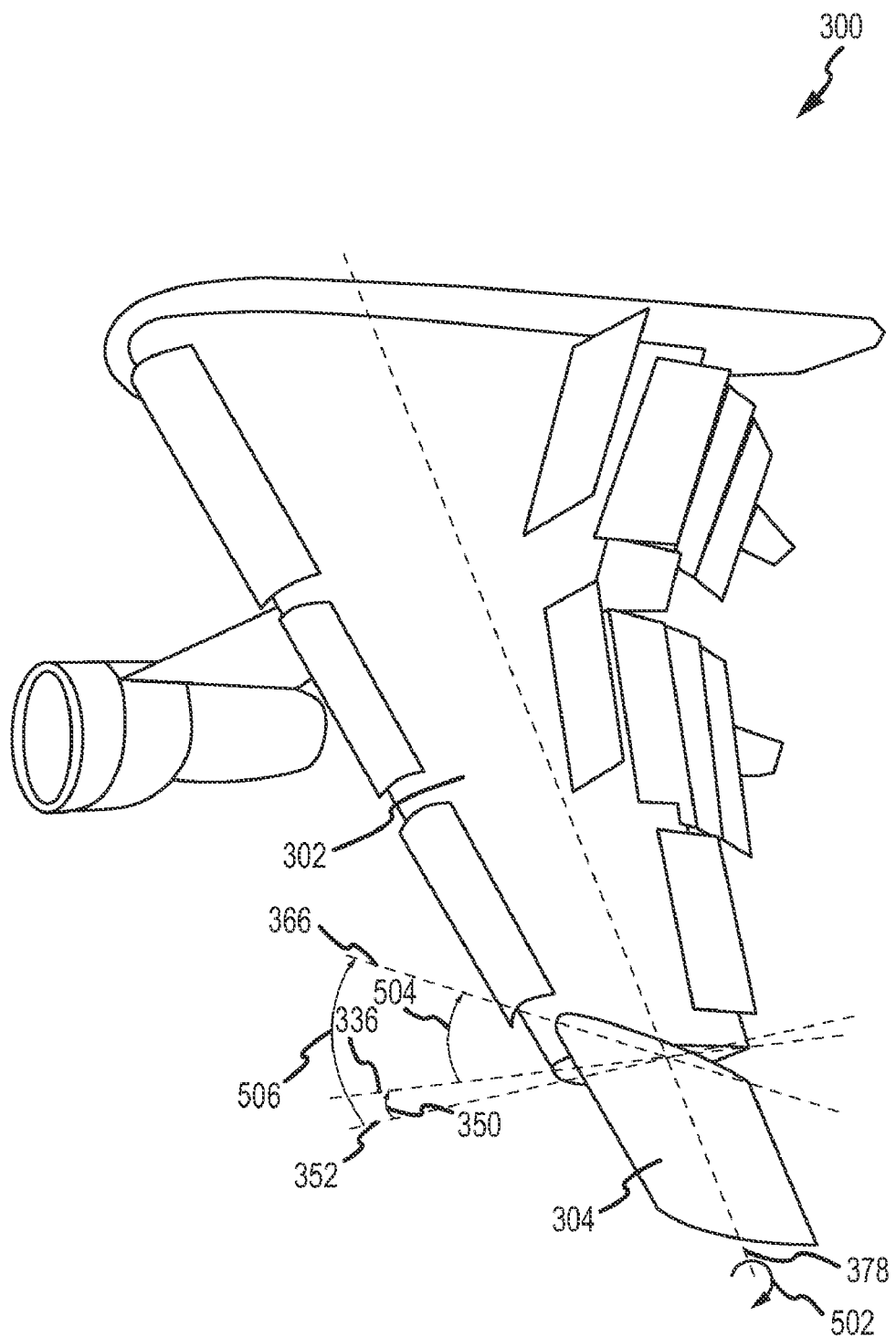
FIG. 5 illustrates an exterior view of the airplane wing of FIG. 3, in which the variable incidence wing tip has been rotated to a second rotated position, in accordance with an example embodiment.

FIG. 5 illustrates an exterior view of the airplane wing 300 of FIG. 3, in which the variable incidence wing tip 304 has been rotated to a second rotated position, in accordance with an example embodiment. In the illustrated embodiment, variable incidence wing tip 304 has been rotated from the non-rotated position (FIG. 3), about rotation axis 378, in a second (clockwise) direction 502 by an angle of rotation 504. Assuming that main wing angle of incidence 350 is considered to be a positive angle, rotation in the first direction 502 has the result of increasing the angle of incidence of variable incidence wing tip 304 from the non-rotated position (FIG. 3) by the angle of rotation 504. The angle of rotation 504 may be quantified as an angular difference between outboard, main wing chord 336 and inboard, wing tip chord 366. The angle of incidence 506 of variable incidence wing tip 304 may be quantified as the angular difference between the offset longitudinal axis 352 and the inboard, wing tip chord 366. In various embodiments, the angle of incidence 506 of variable incidence wing tip 304 may be increased to a larger positive value (when the main wing angle of incidence 350 has a positive value). In an embodiment, variable incidence wing tip 304 may be rotated in the second direction 502 by an angular value within a range of 0 degrees to 90 degrees, and accordingly, variable incidence wing tip 304 may be rotated to have a difference in angle of incidence from the main wing section 302 in a range of 0 degrees to +90 degrees.

Figure 6:
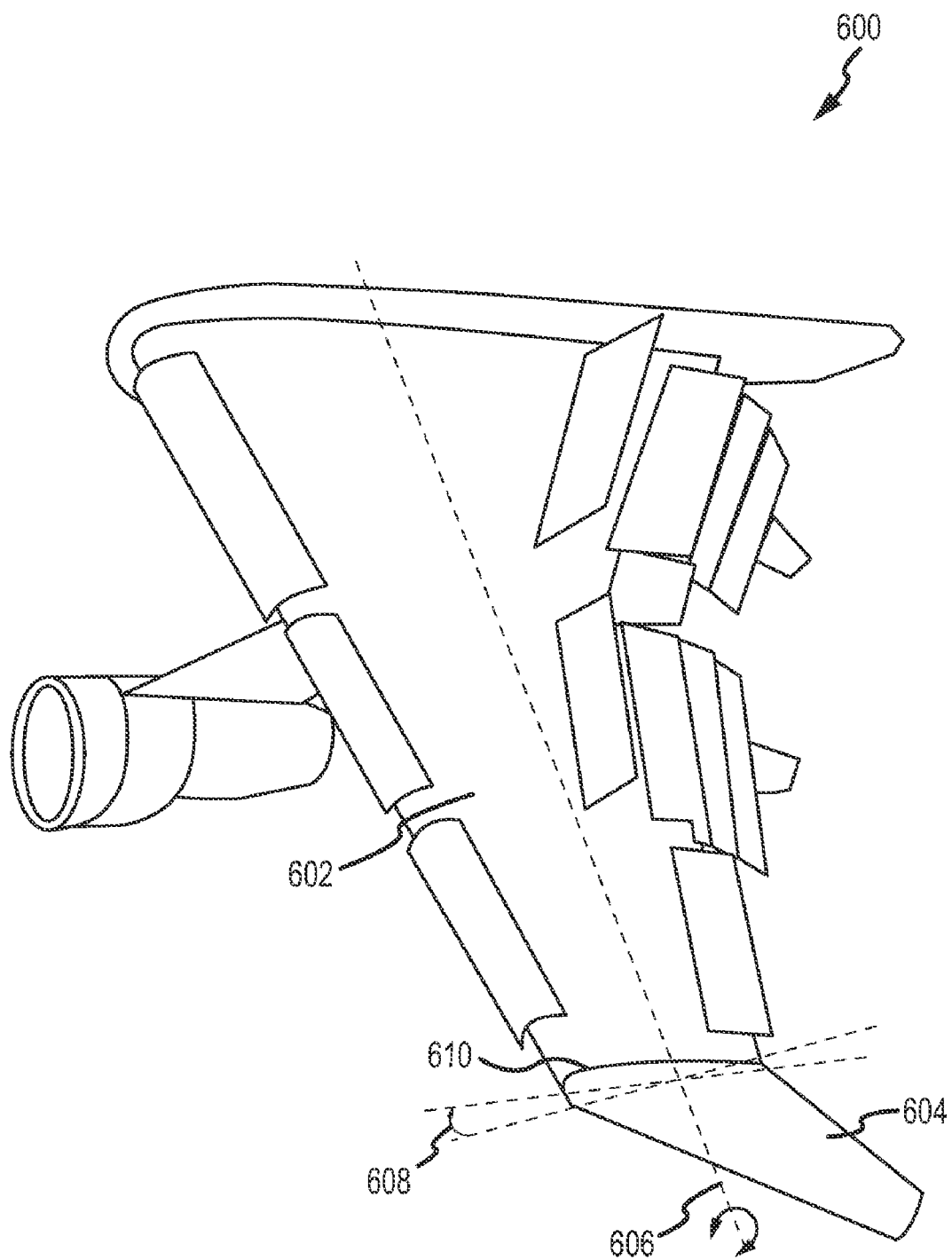
FIG. 6 illustrates an exterior view of an airplane wing, which includes a raked, variable incidence wing tip in a non-rotated position, in accordance with an example embodiment.

FIG. 6 illustrates an exterior view of an airplane wing 600, which includes a raked, variable incidence wing tip 604 in a non-rotated position, in accordance with an example embodiment. Airplane wing 600 may be similar to airplane wing 300 depicted in FIGS. 3-5 in that airplane wing 600 includes a main wing section 602 and variable incidence wing tip 604 that is rotatably connected to the main wing section 602 at a juncture 610. Airplane wing 600 differs from airplane wing 300 in that the variable incidence wing tip 604 is a "raked" wing tip. As discussed previously, a raked, variable incidence wing tip 604 is a variable incidence wing tip for which substantially all or a portion of the wing tip 604 has a larger degree of sweep than the main wing section 602. Raked, variable incidence wing tip 604 may be rotated, about rotation axis 606 in a manner substantially similar to the rotation of the variable incidence wing tip 304, described in conjunction with FIGS. 3-5. Accordingly, the angle of incidence of the raked, variable incidence wing tip 604 may be increased and/or decreased, with respect to the main wing angle of incidence 608.

Figure 8:
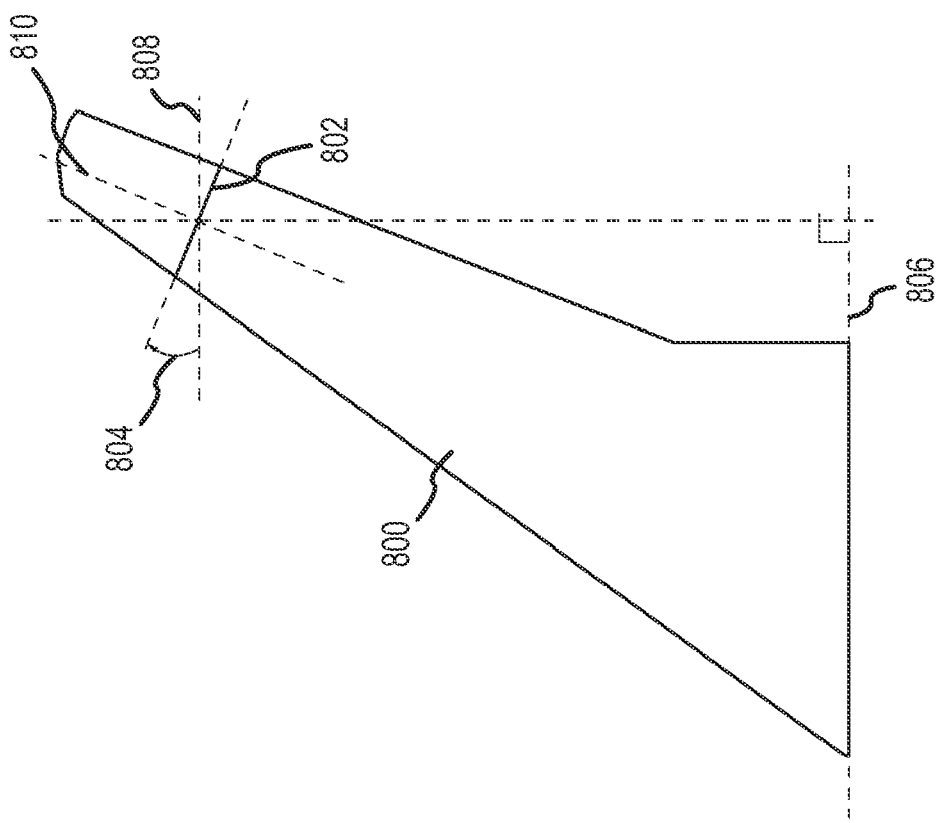
FIG. 8 illustrates a top, exterior view of an airplane wing, which includes a juncture established at a second angle, with respect to a longitudinal axis of the airplane, in accordance with an example embodiment.
Figure 7:
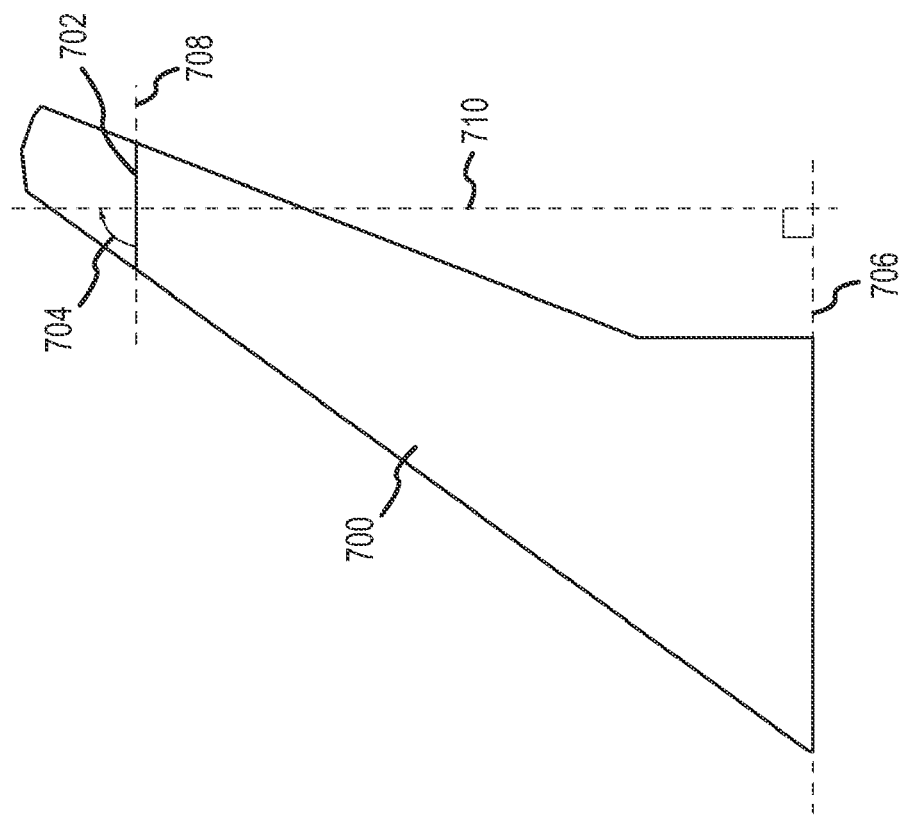
FIG. 7 illustrates a top, exterior view of an airplane wing, which includes a juncture established at a first angle, with respect to a longitudinal axis of the airplane, in accordance with an example embodiment.
Figure 10:
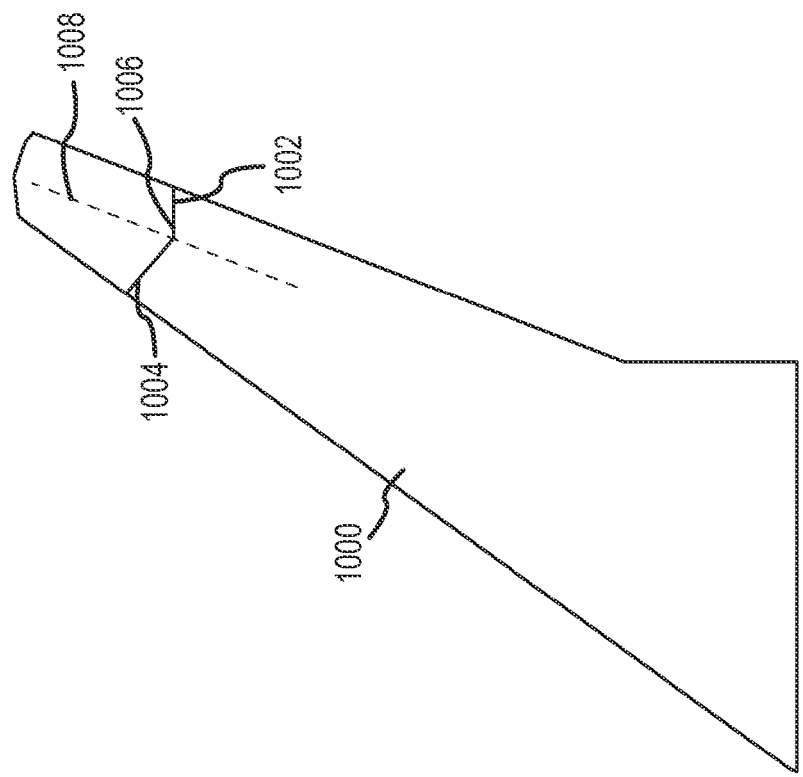
FIG. 10 illustrates a top, exterior view of an airplane wing, which includes a non-planar juncture, in accordance with an example embodiment.
Figure 9:
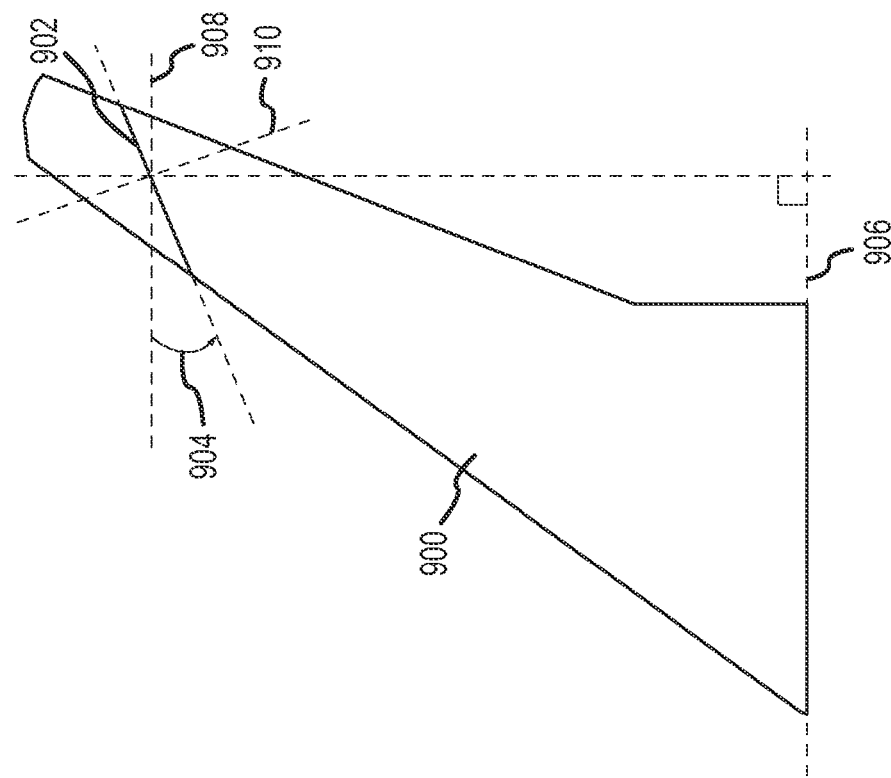
FIG. 9 illustrates a top, exterior view of an airplane wing, which includes a juncture established at a third angle, with respect to a longitudinal axis of the airplane, in accordance with an example embodiment.

As discussed previously, a variable incidence wing tip (e.g., variable incidence wing tip 304, 604, FIGS. 3, 6) is connected to a main wing section (e.g., main wing section 302, 602, FIGS. 3, 6) at a juncture (e.g., junctures 330, 610, FIGS. 3, 6). A "juncture interface" may be defined as a cross-section through a juncture. In an embodiment, when the juncture perimeters of the main wing section and the variable incidence wing tip lie in substantially parallel planes, the juncture interface may be a substantially planar juncture interface. In other embodiments, when the juncture perimeters of the main wing section and the variable incidence wing tip do not lie in planes (e.g., they are three-dimensional shapes), the juncture interface may be a non-planar juncture interface. FIGS. 7-9 illustrate embodiments in which each juncture defines a substantially planar juncture interface, although the angles of the juncture interfaces differ, in each figure, with respect to the longitudinal axis of the aircraft or some other reference. FIG. 10 illustrates an example embodiment in which a juncture defines a non-planar juncture interface.

Referring first to embodiments in which the juncture defines a substantially planar juncture interface, FIG. 7 illustrates a top, exterior view of an airplane wing 700, which includes a juncture 702 established at a first angle 704, with respect to the longitudinal axis of the airplane (offset longitudinal axes are indicated by lines 706, 708), in accordance with an example embodiment. In the illustrated embodiment, the first angle 704 is about equal to 90 degrees, and accordingly the juncture interface is substantially parallel to the longitudinal axis. The rotation axis 710 may be an axis that is substantially perpendicular to the juncture interface, and thus to the longitudinal axis, in an embodiment, although the rotation axis may not be perpendicular to the juncture interface, in other embodiments.

FIG. 8 illustrates a top, exterior view of an airplane wing 800, which includes a juncture 802 established at a second angle 804, with respect to a longitudinal axis of the airplane (offset longitudinal axes are indicated by lines 806, 808), in accordance with an example embodiment. In the illustrated embodiment, the second angle 804 is a positive angle in a range of about 5 degrees to about 20 degrees, and accordingly the juncture interface is non-parallel with the longitudinal axis. In other embodiments, the second angle 804 may be a larger or smaller positive angle than the above given range. The rotation axis 810 may be an axis that is substantially perpendicular to the juncture interface, in an embodiment, although the rotation axis may not be perpendicular to the juncture interface, in other embodiments.

FIG. 9 illustrates a top, exterior view of an airplane wing 900, which includes a juncture 902 established at a third angle 904, with respect to a longitudinal axis of the airplane (offset longitudinal axes are indicated by lines 906, 908), in accordance with an example embodiment. In the illustrated embodiment, the third angle 904 is a negative angle in a range of about −5 degrees to about −20 degrees, and accordingly the juncture interface is non-parallel with the longitudinal axis. In other embodiments, the third angle 904 may be a larger or smaller negative angle than the above given range. The rotation axis 910 may be an axis that is substantially perpendicular to the juncture interface, in an embodiment, although the rotation axis may not be perpendicular to the juncture interface, in other embodiments.

FIG. 10 illustrates a top, exterior view of an airplane wing 1000, which includes a non-planar juncture 1002, in accordance with an example embodiment. The non-planar juncture 1002 includes two substantially planar juncture portions 1004, 1006, which intersect within juncture 1002. In an alternate embodiment, a non-planar juncture 1002 may have a curved or irregular shape, rather than being composed of multiple substantially planar portions. The rotation axis 1008 is an axis that lies between the planar juncture portions 1004, 1006.

Figure 11:
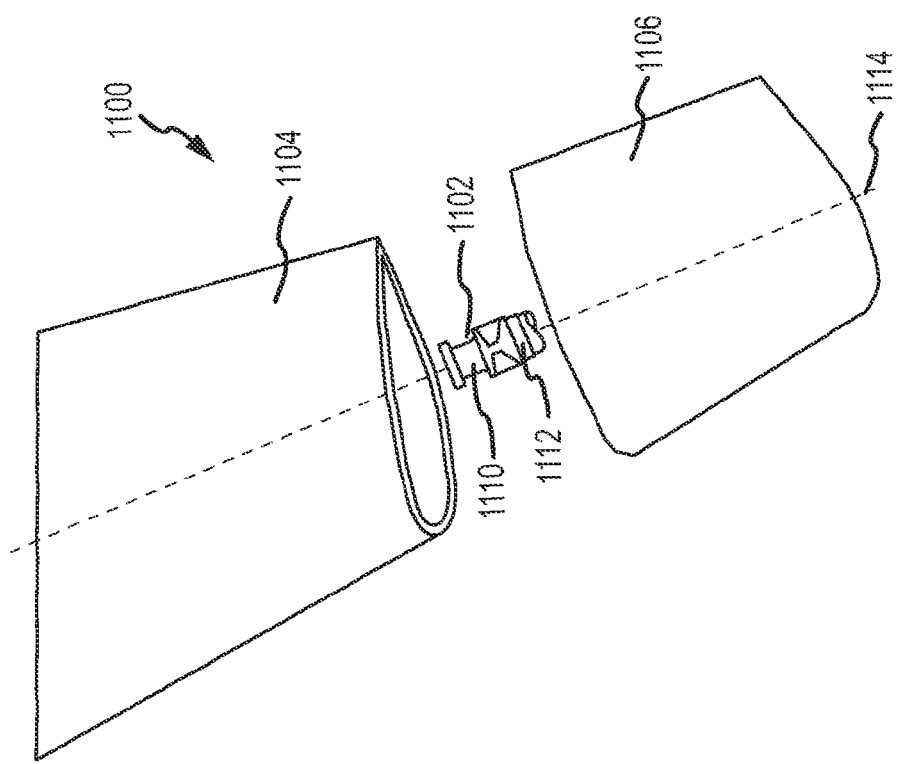
FIG. 11 illustrates an exploded view of a portion of an airplane wing, which includes a wing tip rotation mechanism, which rotatably connects a main wing section and a variable incidence wing tip, in accordance with an example embodiment.

As discussed previously, a main wing section (e.g., main wing section 102, FIG. 1) and a variable incidence wing tip (e.g., variable incidence wing tip 104, FIG. 1) are connected together using a rotation mechanism (e.g., wing tip rotation mechanism 152) that connects to both the main wing section and the variable incidence wing tip, and that spans juncture. FIG. 11 illustrates an exploded view of a portion of an airplane wing 1100, which includes a wing tip rotation mechanism 1102, which rotatably connects a main wing section 1104 and a variable incidence wing tip 1106, in accordance with an example embodiment. In an embodiment, wing tip rotation mechanism 1102 includes a spindle mechanism, having a body 1110, and a shaft 1112. The longitudinal axis of the shaft 1112 may define the rotation axis 1114 around which the variable incidence wing tip 1106 rotates, with respect to the main wing section 1104. In an embodiment, body 1110 may be mounted main wing section 1104, and an end of shaft 1112 may be connected to variable incidence wing tip 1106. In another embodiment, body 1110 may be mounted to variable incidence wing tip 1106, and an end of shaft 1112 may be connected to main wing section 1104. Either way, rotation mechanism 1102 is adapted to rotate shaft 1112 in order to rotate variable incidence wing tip 1106, with respect to main wing section 1104. In other embodiments, different types of rotation mechanisms 1102 may be used. For example, in an alternate embodiment, wing tip rotation mechanism 1102 may include a rotary motor having a stator housed by a body and a rotor connected to a shaft, which provides similar functionality as a spindle mechanism.

As FIGS. 4 and 5 illustrate, when a variable incidence wing tip (e.g., variable incidence wing tip 304, FIG. 4) is in a position other than a non-rotated position, abrupt discontinuities in the surface of the wing exist in proximity to the juncture. During flight, these discontinuities may result in various vortices or other air flow artifacts, which may unpredictably affect the performance of the aircraft. In an embodiment, an aircraft may include one or more structures adapted to smooth the discontinuities in the surface of the wing when a variable incidence wing tip is in a portion other than a non-rotated position.

Figure 12:
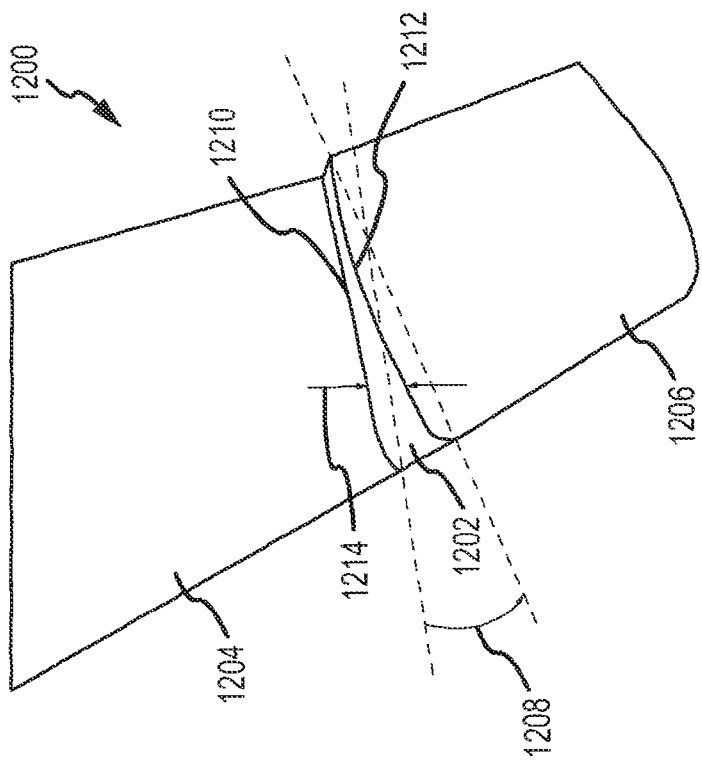
FIG. 12 illustrates an exterior view of a portion of an airplane wing that includes a morphable structure connected between a main wing section and a variable incidence wing tip, in accordance with an example embodiment.

FIG. 12 illustrates an exterior view of a portion of an airplane wing 1200 that includes a morphable structure 1202 connected between a main wing section 1204 and a variable incidence wing tip 1206, in accordance with an example embodiment. Variable incidence wing tip 1206 is shown to be rotated by a rotation angle 1208, with respect to main wing section 1204. In an embodiment, morphable structure 1202 is a flexible, generally tubular structure having a first end 1210 that connects around a perimeter of the outboard end of main wing section 1204, and a second end 1212 that connects around a perimeter of the inboard end of variable incidence wing tip 1206. The width 1214 of morphable structure 1202 may vary around its circumference as the distances between adjacent points of the main wing section 1204 and the variable incidence wing tip 1206 vary at different rotation angles. Accordingly, morphable structure 1202 may be formed from an elastic material, a series of overlapping flaps, and/or other types of structures, which enable the width 1214 of morphable structure 1202 to vary around its circumference. The average width 1214 may be the smallest when variable incidence wing tip 1206 is in a non-rotated position (e.g., FIG. 3), which corresponds to a state in which morphable structure 1202 is in its most compressed operational state. The average width 1214 may be the greatest when variable incidence wing tip 1206 is rotated by a maximum angle within its range of rotation, which corresponds to a state in which at least portions of morphable structure 1202 are in their most expanded operational states.

Figure 13:
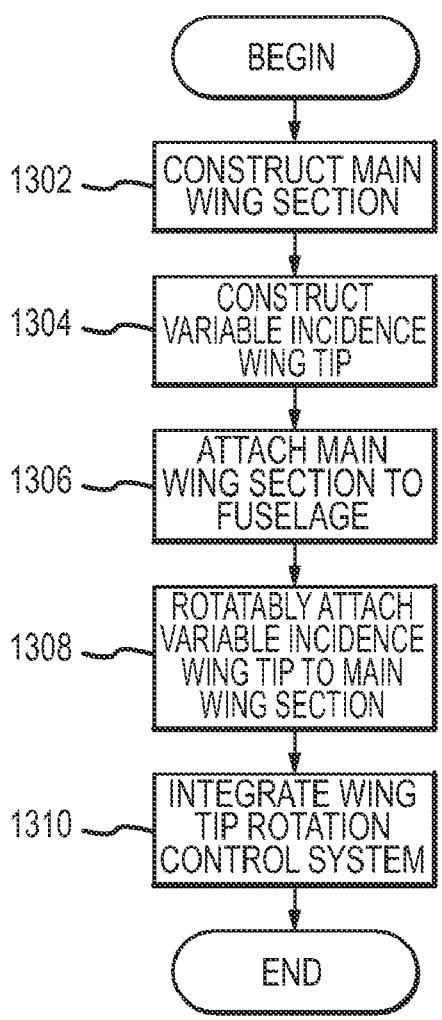
FIG. 13 illustrates a flowchart of a method for manufacturing an aircraft having at least one variable incidence wing tip, in accordance with an example embodiment.

Embodiments of methods of manufacturing an aircraft having at least one variable incidence wing tip will now be described. FIG. 13 illustrates a flowchart of a method for manufacturing an aircraft having at least one variable incidence wing tip, in accordance with an example embodiment. It is to be understood that the various steps described in conjunction with FIG. 13 may be performed in different orders than the illustrated and described order, and/or some steps may be performed in parallel with each other.

The method may begin, in block 1302, by constructing or obtaining a main wing section (e.g., main wing section 302, FIG. 3) of an airplane wing. The main wing section is constructed, in an embodiment, with an outboard end (e.g., outboard end 334, FIG. 3) that is adapted to be rotatably connected to a variable incidence wing tip and to a rotation mechanism for rotating the variable incidence wing tip. The main wing section may be constructed to include one or more flight control surfaces, as discussed previously. In an embodiment, the main wing section may be constructed using conventional wing construction techniques and materials.

In block 1304, a variable incidence wing tip (e.g., variable incidence wing tip 304, FIG. 3) may be constructed. Similar to the construction of the main wing section, the variable incidence wing tip is constructed, in an embodiment, with an inboard end (e.g., inboard end 356, FIG. 3) that is adapted to be rotatably connected to a main wing section and to a rotation mechanism for rotating the variable incidence wing tip. The variable incidence wing tip may be constructed to include one or more flight control surfaces and/or a wingtip device, such as a winglet (e.g., a near-vertical, upward extension of a wing tip), a wing fence (e.g., a variation of a winglet with near-vertical, upward and downward extensions of a wing tip), or a planar wing extension, in various embodiments.

In block 1306, an inboard end (e.g., inboard end 332, FIG. 3) of the main wing section may be attached to a fuselage (e.g., fuselage 104, FIG. 1) using conventional techniques. In block 1308, the inboard end (e.g., inboard end 356, FIG. 3) of the variable incidence wing tip is rotatably attached to the outboard end (e.g., outboard end 334, FIG. 3) of the main wing section. In an embodiment, this may include attaching a wing tip rotation mechanism (e.g., wing tip rotation mechanism 152, 1102, FIGS. 1, 11) to the main wing section and the variable incidence wing tip. The wing tip rotation mechanism may form a portion of a wing tip rotation control system.

In block 1310, additional portions of a wing tip rotation control system may be integrated with the aircraft, in order to allow the angle of incidence of the variable incidence wing tip to be controlled. This may include, for example, installing a cockpit controller (e.g., cockpit controller 150, FIG. 1) and a control signal transmission means (e.g., control signal transmission means 154, FIG. 1) between the cockpit controller and the wing tip rotation mechanism. After completion of additional manufacturing, assembly, and test procedures, the aircraft may be deemed ready for operations.

Figure 14:
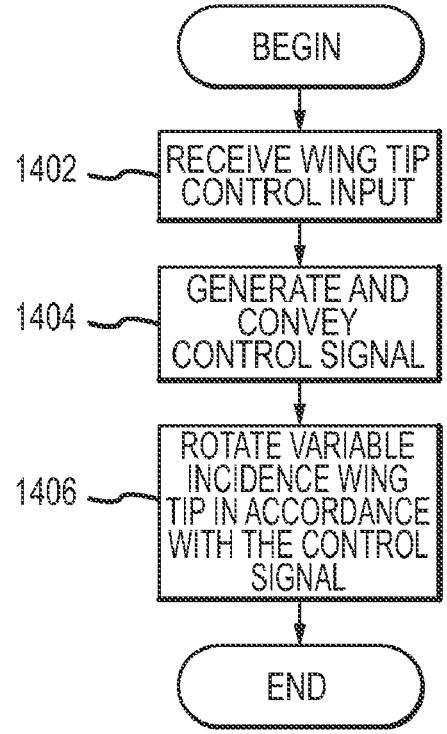
FIG. 14 illustrates a flowchart of a method for operating an aircraft, and more particularly for controlling the angle of incidence of a variable incidence wing tip of an aircraft, in accordance with an example embodiment.

Embodiments of methods of controlling a variable incidence wing tip will now be described. FIG. 14 illustrates a flowchart of a method for operating an aircraft, and more particularly for controlling the angle of incidence of one or more variable incidence wing tips of an aircraft, in accordance with an example embodiment. In an embodiment, the method may begin by receiving a wing tip control input, in block 1402, which indicates a desired angle of incidence or a desired change in the current angle of incidence of a variable incidence wing tip. The desired angle of incidence may be indicated with respect to the main wing angle of incidence, the current angle of attack, the longitudinal axis, or some other reference, in various embodiments. For example, a wing tip control input may be received through a user interface input mechanism associated with a cockpit controller (e.g., cockpit controller 150, FIG. 1). User interface input mechanisms may include one or more touchscreens, keypads, microphones, dials, levers or other user interface input mechanisms, which enable a pilot or other flight personnel to indicate a desired angle of rotation for the variable incidence wing tip. In another embodiment, a wing tip control input may automatically be generated based on sensing and/or feedback information regarding aircraft performance, aircraft functionality, wind conditions, or other detectable parameters or phenomenon.

Either way, a control signal is generated, in block 1404, based on the control input. The control signal is conveyed to the wing tip rotation mechanism (e.g., via control signal transmission means 154, FIG. 1). In block 1406, the wing tip rotation mechanism (e.g., wing tip rotation mechanism 152, 1102, FIGS. 1, 11) rotates the variable incidence wing tip in accordance with the control signal. The angle of incidence of a variable incidence wing tip may be controlled at various times during operation of the aircraft to achieve various effects. For example, the angle of incidence may be controlled on the ground, during takeoff and/or landing, and/or during ascents, descents, cruising, and turning operations for a variety of reasons, as discussed previously.

In an embodiment in which a single variable incidence wing tip is being rotated, a single control signal may be generated and conveyed to the corresponding wing tip rotation mechanism, as described above. In an embodiment in which two variable incidence wing tips are being rotated (e.g., one on each wing) in a same direction and/or to have substantially a same angle of incidence, the same control signal may be conveyed to the two wing tip rotation mechanisms corresponding to both variable incidence wing tips. In an embodiment in which two variable incidence wing tips are being rotated in opposite directions and/or to have significantly different angles of incidence, different control signals may be generated and conveyed to the two wing tip rotation mechanisms.

Thus, embodiments of variable incidence wing tips, and aircraft and aircraft wings that include them, have been described herein. As used herein, the term "substantially parallel" means equal to or within a range of plus or minus 5 degrees of each other. The term "substantially perpendicular" means having exactly a 90 degree separation, or a separation within a range of 85 degrees to 95 degrees of each other. The term "substantially planar" means having all points falling exactly within the same plane, or having points that fall within insubstantial distances from a plane (e.g., distances less than plus or minus 10 centimeters). The term "substantially co-planar" means exactly co-planar, or lying in intersecting planes that have an angular difference of plus or minus 5 degrees of each other, or lying in non-intersecting planes that are separated by an insubstantial distance (e.g., a distance less than 10 centimeters).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An aircraft comprising:
   a fuselage; and
   at least one wing connected to the fuselage, wherein a wing of the at least one wing includes
   a main wing section having a main wing inboard end and a main wing outboard end, wherein the main wing inboard end is adapted to connect to the fuselage at a first angle of incidence, and
   a variable incidence wing tip having a wing tip inboard end and a wing tip outboard end, wherein the wing tip inboard end is connected to the main wing outboard end forming a non-planar juncture so that the variable incidence wing tip is rotatable to angles of incidence that are different from the first angle of incidence; at least a portion of said variable incidence wing tip has a larger degree of sweep than the main wing section.

2. The aircraft of claim 1, wherein the variable incidence wing tip includes a raked wing tip.

3. The aircraft of claim 1, wherein a juncture between the main wing section and the variable incidence wing tip is at a first angle with respect to a longitudinal axis of the aircraft, wherein the first angle is about 90 degrees.

4. The aircraft of claim 1, wherein a juncture between the main wing section and the variable incidence wing tip is at a first angle with respect to a longitudinal axis of the aircraft, wherein the first angle is in a range of about −20 degrees to about +20 degrees.

5. The aircraft of claim 1, further comprising a wing tip rotation mechanism that connects to the main wing section and to the variable incidence wing tip so that the variable incidence wing tip is rotatable about a rotation axis, with respect to the main wing section.

6. The aircraft of claim 5, further comprising a wing tip rotation control system adapted to control an angle of incidence of the variable incidence wing tip, wherein the wing tip rotation control system includes a cockpit controller, the wing tip rotation mechanism, and control signal transmission means between the cockpit controller and the wing tip rotation mechanism.

7. The aircraft of claim 1, wherein the aircraft is a vehicle selected from a group of vehicles that include an airplane, a glider, a missile, a rocket, a satellite, a spacecraft, and a spaceplane.

8. A wing for an aircraft comprising:
   a main wing section having a main wing inboard end and a main wing outboard end, wherein the main wing inboard end is adapted to connect to the fuselage at a first angle of incidence; and
   a variable incidence wing tip having a wing tip inboard end and a wing tip outboard end, wherein the wing tip inboard end is connected to the main wing outboard end at a non-planar juncture comprising two substantially planar juncture portions so that the variable incidence wing tip is rotatable to angles of incidence that are different from the first angle of incidence.

9. The wing of claim 8, wherein the variable incidence wing tip is rotatable to angles of incidence in a range of +90 degrees to −90 degrees above and below the first angle of incidence.

10. The wing of claim 8, wherein the variable incidence wing tip includes a non-planar juncture formed by two substantially planar junction portions.

11. The wing of claim 8, wherein a length of the variable incidence wing tip is in a range of about 5% to about 30% of an overall length of the wing.

12. The wing of claim 8, wherein the variable incidence wing tip includes a wingtip device selected from a group of devices that includes a winglet, a wing fence, and a planar wing extension.

13. The wing of claim 8, further comprising:
   a morphable structure connected between the main wing section and the variable incidence wing tip.

14. The wing of claim 13, wherein the morphable structure is a flexible, generally tubular structure having a first end that connects around a perimeter of the main wing outboard end, and a second end that connects around a perimeter of the wing tip inboard end.

15. The wing of claim 8, further comprising a wing tip rotation mechanism that connects to the main wing section and to the variable incidence wing tip so that the variable incidence wing tip is rotatable, with respect to the main wing section, about a rotation axis that is substantially perpendicular to a juncture between the main wing section and the variable incidence wing tip.

16. A method for operating an aircraft, the method comprising the steps of:
generating a first control signal, based on an indication of a desired angle of incidence of a first variable incidence wing tip that is rotatably connected to an outboard end of a first main wing section of the aircraft;
forming a non-planar juncture between an inboard end of said wing tip and an outboard end of said main wing;
providing at least a portion of said first variable incidence wing tip with a larger degree of sweep than said first main wing section;
conveying the first control signal to a first wing tip rotation mechanism connected to the first main wing section and to the first variable incidence wing tip; and
rotating the first variable incidence wing tip in accordance with the first control signal, so that the angle of incidence of the first variable incidence wing tip is different from an angle of incidence of the first main wing section.

17. The method of claim 16, further comprising:
conveying the first control signal to a second wing tip rotation mechanism connected to a second main wing section and to a second variable incidence wing tip that is rotatably connected to an outboard end of the second main wing section; and
rotating the second variable incidence wing tip in accordance with the first control signal so that the first variable incidence wing tip and the second variable incidence wing tip are rotated to have substantially a same angle of incidence.

18. The method of claim 16, further comprising:
generating a second control signal, based on the control input;
conveying the second control signal to a second wing tip rotation mechanism connected to a second main wing section and to a second variable incidence wing tip that is rotatably connected to an outboard end of the second main wing section; and
rotating the second variable incidence wing tip in accordance with the second control signal so that the first variable incidence wing tip and the second variable incidence wing tip are rotated to have different angles of incidence.

19. The method of claim 16, further comprising:
receiving a wing tip control input from a user interface input mechanism, and
wherein generating the first control signal comprises generating the first control signal based on the wing tip control input.

20. The method of claim 16, further comprising:
generating a wing tip control input based on sensing and feedback information, and
wherein generating the first control signal comprises generating the first control signal based on the wing tip control input.

* * * * *